US012562864B2

(12) United States Patent
Priyanto et al.

(10) Patent No.: US 12,562,864 B2
(45) Date of Patent: Feb. 24, 2026

---

(54) POSITIONING IN A WIRELESS COMMUNICATION NETWORK

(71) Applicant: Sony Group Corporation, Tokyo (JP)

(72) Inventors: Basuki Priyanto, Lund (SE); Fredrik Rusek, Eslöv (SE); Erik Bengtsson, Eslöv (SE)

(73) Assignee: Sony Group Corporation, Tokyo (JP)

( * ) Notice: Subject to any disclaimer, the term of this patent is extended or adjusted under 35 U.S.C. 154(b) by 400 days.

(21) Appl. No.: 17/922,408

(22) PCT Filed: Mar. 16, 2021

(86) PCT No.: PCT/EP2021/056600
§ 371 (c)(1),
(2) Date: Oct. 31, 2022

(87) PCT Pub. No.: WO2021/228453
PCT Pub. Date: Nov. 18, 2021

(65) Prior Publication Data
US 2023/0198709 A1 Jun. 22, 2023

(30) Foreign Application Priority Data
May 15, 2020 (SE) .................................... 2030162-8

(51) Int. Cl.
*H04L 5/00* (2006.01)
*H04W 8/00* (2009.01)
*H04W 64/00* (2009.01)

(52) U.S. Cl.
CPC ........... *H04L 5/0051* (2013.01); *H04W 8/005* (2013.01); *H04W 64/00* (2013.01)

(58) Field of Classification Search
CPC ...... H04W 8/005; H04W 64/00; H04L 5/0051
See application file for complete search history.

(56) References Cited

U.S. PATENT DOCUMENTS 9,713,117 B2 * 7/2017 Khoryaev ............. H04W 64/00
10,567,905 B2 * 2/2020 Edge ......................... G01S 5/10
(Continued)

FOREIGN PATENT DOCUMENTS

WO 2016048510 A1 3/2016
WO 2017164925 A1 9/2017

OTHER PUBLICATIONS

International Search Report and Written Opinion from corresponding International Application No. PCT/EP2021/056600, mailed on May 27, 2021, 14 pages.
(Continued)

*Primary Examiner* — Congvan Tran
(74) *Attorney, Agent, or Firm* — Tucker Ellis LLP

(57) ABSTRACT

A method for operating a network node in a wireless communication network comprises determining whether a positioning process for positioning of a first communication device operated in the wireless communication network fulfils at least one predefined criterion; and, upon determining that the positioning process fulfils the at least one predefined criterion: triggering at least one second communication device operated in the wireless communication network and located within radio range of the first communication device to transmit a PRS associated with the positioning process, to thereby increase a positioning accuracy of the positioning of the first communication device provided by the positioning process.

20 Claims, 7 Drawing Sheets

(56)     References Cited

U.S. PATENT DOCUMENTS

| | | | |
|---|---|---|---|
| 10,638,254 B2 * | 4/2020 | Jain ......................... | H04W 4/02 |
| 2016/0095080 A1 * | 3/2016 | Khoryaev ............. | G01S 5/0284 |
| | | | 455/456.1 |
| 2016/0205504 A1 | 7/2016 | Chen | |
| 2016/0227373 A1 | 8/2016 | Tsai | |
| 2016/0337805 A1 | 11/2016 | Liao | |
| 2019/0230618 A1 | 7/2019 | Saur | |
| 2019/0239181 A1 * | 8/2019 | Gangakhedkar ...... | H04W 64/00 |
| 2019/0302220 A1 | 10/2019 | Kumar | |
| 2019/0394634 A1 | 12/2019 | Akkarakaran | |
| 2021/0048504 A1 * | 2/2021 | Hayakawa ................ | G01S 5/14 |
| 2022/0018968 A1 * | 1/2022 | Tsumura ................. | H04W 4/02 |
| 2022/0141795 A1 * | 5/2022 | Ku ...................... | H04W 64/006 |
| | | | 455/456.6 |

OTHER PUBLICATIONS

Institute for Information Industry (III), "Refine positioning of legacy UE with assistance by nearby ProSe-enabled UE", 3GPP TSG RAN WG2 Meeting #91bis, R2-154414, Oct. 5-9, 2015, 6 pages.

Office Action and Search Report from corresponding Swedish Application No. 2030162-8, mailed on Mar. 22, 2021, 15 pages.

* cited by examiner

— 201

— 202

— 203

— 110

— 301

— 302

— 303

— 120

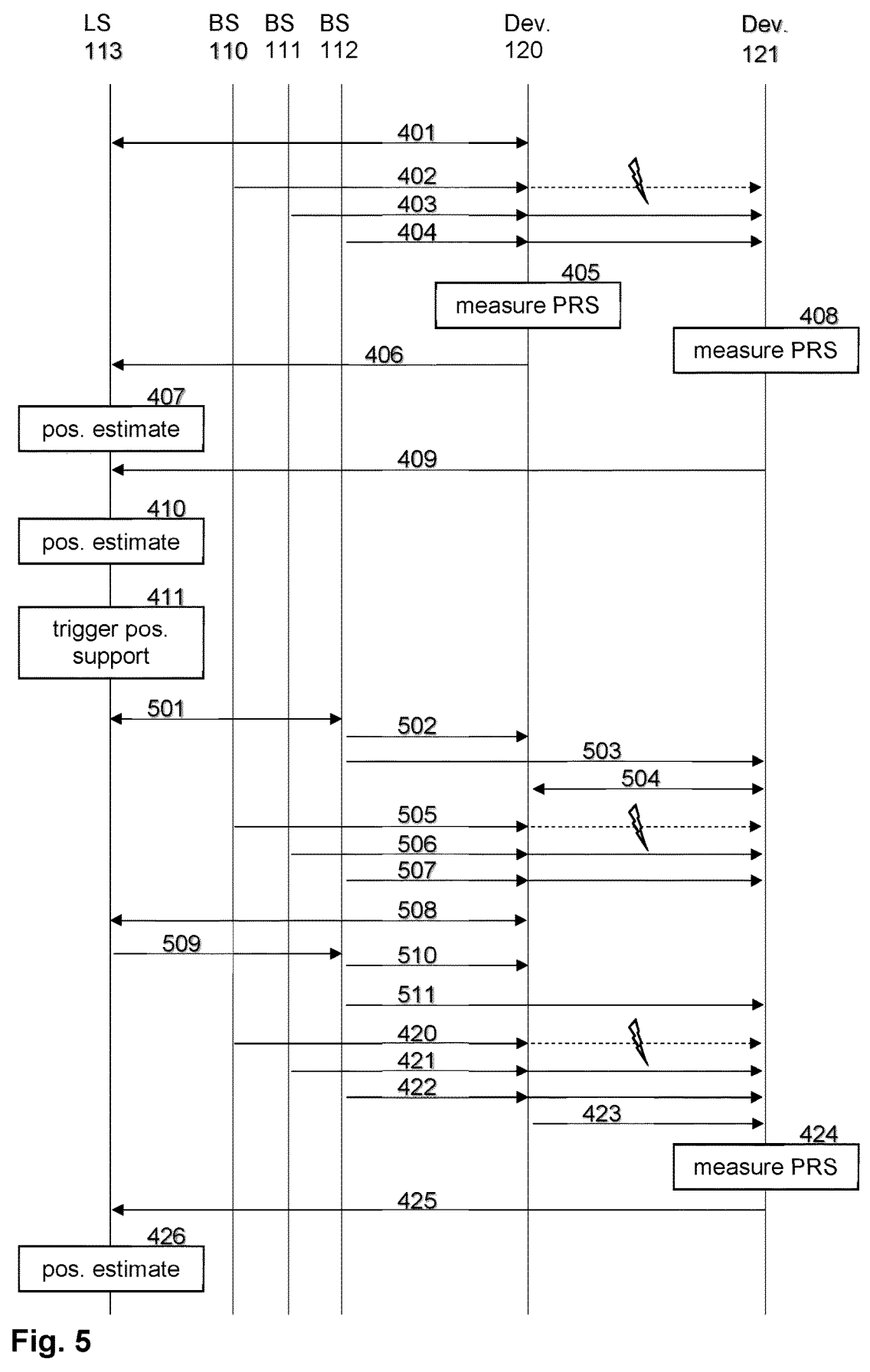

| LS 113 | BS 110 | BS 111 | BS 112 | Dev. 120 | Dev. 121 |
|--------|--------|--------|--------|----------|----------|

401

402

403

404

405 measure PRS

408 measure PRS

406

407 pos. estimate

409

410 pos. estimate

411 trigger pos. support

501

502

503

504

505

506

507

508

509

510

511

420

421

422

423

424 measure PRS

425

426 pos. estimate

Fig. 5

| Monitor DL-PRS | 701 |
| Transmit measurement results | 702 |
| Transmit request | 703 |
| Receive trigger incl. resource | 704 |
| Monitor DL-PRS and additional PRS | 705 |
| Transmit measurement results | 706 |

POSITIONING IN A WIRELESS COMMUNICATION NETWORK

FIELD OF THE INVENTION

Various examples relate to methods for operating devices in a wireless communication network. In particular, various examples relate to methods for operating a network node for enabling and improving a positioning estimate for a communication device in the wireless communication network. Furthermore, various examples relate to methods for operating a communication device for estimating its position. Various further examples relate to methods for a communication device participating in estimating a position of another communication device. The present invention relates furthermore to devices implementing the methods.

BACKGROUND OF THE INVENTION

Positioning of a device, in particular a wireless mobile communication device (hereinafter, sometimes abbreviated communication device, for sake of simplicity), for example a smart phone, a tablet PC, an Internet of Things (IoT) device or any other type of terminal device or user equipment, is an important and often required functionality of applications used in connection with the device. Accurate positioning may be achieved by a combination of multiple technologies for positioning processes, including for example GNSS (Global Navigation Satellite System) based solutions providing accurate positioning in outdoor scenarios, radio technologies, for example Third Generation Partnership (3GPP) Long Term Evolution (LTE) and New Radio (NR) networks offering multiple design options to locate a communication device, IEEE Wi-Fi networks or terrestrial beacon systems, and IMU (Inertial Measurement Units) or sensors, for example accelerometers, gyroscopes, magnetometers or atmospheric pressure sensors.

In particular, the 3GPP LTE and 3GPP NR (New Radio) technologies may provide enhanced positioning capabilities. An exemplary positioning process is described next: For example, network nodes, for example base stations, of a wireless communication network may transmit downlink (DL) positioning reference signals (PRS). A communication device may receive the downlink PRSs and, based on the received DL PRSs, a position of the communication device may be determined. The position of the communication device may be determined in the communication device itself or in a Location Server (LS) of the wireless communication network. For example, the communication device may determine the timing of the arrival of the received PRSs, for example a time difference of arrival (TDOA) of the PRSs, and may transmit the determined timing measurements to the network, for example a base station (BS) or LS. In the network, the position of the communication device may be determined based on the timing measurements and positioning information indicating origins from where the PRSs were transmitted. As a result, the determined position may be transmitted to the communication device. As an alternative, the communication device may determine its position based on the timing measurements and positioning information indicating from where the PRSs were transmitted. The positioning information may comprise absolute positions of antennas from which the PRSs were transmitted as well as synchronisation offsets needed for position estimation.

As the positioning relies on time of flight considerations of the PRSs, an accurate timing and synchronisation of the participating devices—i.e., devices transmitting and receiving the PRSs—may be important. Further, positioning based on DL PRSs requires that the communication device receives PRSs from a plurality of network nodes, for example from at least three BSs. Hence, multilateration or a process to estimate the position can be performed based on TDOA of a PRS from plurality of network node. In 3GPP NR and 3GPP LTE networks, the network nodes, for example the BSs eNodeB or gNodeB, may be connected via an X2 interface, for example a cable or fibre connection. This connection enables the network nodes to maintain an accurate time synchronisation.

In various situations, the availability of multiple network nodes may be limited, for example in street canyons or in rural environments. For example, in view of cost effectiveness, large overlapping cell coverage is avoided unless needed for capacity reasons. Further, for capacity enhancements often the same cell-plan is reused, which results in co-located transmission/reception points (TRPs), such that positioning is not improved by these additional TRPs.

Additionally, the positioning accuracy may depend to a large extent on a signal-to-noise ratio (SNR) of the received PRSs. However, providing PRSs from a plurality of network nodes with a sufficient SNR may not be achieved in various situations, for example indoor environments or in rural areas.

In various scenarios, one or more of the network nodes may be far apart from the communication device and, based on the time difference of arrival (TDOA), a high accuracy of the positioning may not be achievable.

SUMMARY OF THE INVENTION

In view of the above, there is a need in the art for enhancing an accuracy of positioning processes.

According to the present disclosure, this object is achieved by the features of the independent claims. The dependent claims define embodiments of the disclosure.

According to various examples, a method for operating a network node in a wireless communication network is provided. The method comprises determining whether a positioning process for positioning of a first communication device operated in the wireless communication network fulfils at least one predefined criterion. Upon determining that the positioning process fulfils the at least one predefined criterion, at least one second communication device operated in the wireless communication network is triggered to transmit a PRS associated with the positioning process, to thereby increase a positioning accuracy of the positioning of the first communication device provided by the positioning process.

For example, the first communication device may be a mobile communication device, for example a user equipment like a mobile telephone, in particular a so-called smart phone, a tablet PC or an Internet of Things (IoT) device. A positioning with high accuracy for the first communication device may be required. Applications—e.g., location-based services, geofencing, emergency services, and/or navigation, etc.—may be executed at the first communication device and/or the network and may use the position determined by the positioning process.

For example, the second communication device may comprise a wireless communication device, a mobile communication device, or a wireless mobile communication device, in particular a terminal device or user equipment, for example a mobile telephone, in particular a so-called smart phone, a tablet PC or an Internet of Things (IoT) device. For example, the second communication device is a device which is not part of the infrastructure of the wireless communication network. Thus, the positioning process for accurate positioning of the first communication device may be supported by a non-infrastructure device of the wireless communication network, i.e. by the second communication device. A single second communication device or a plurality of second communication devices may participate in the positioning process for improving positioning of the first communication device. As a general rule, there can be a tendency of obtaining a higher positioning accuracy for a larger count of second communication devices transmitting PRSs. In particular, this may be beneficial in scenarios of emergency situations, indoor navigation, or industrial positioning.

The at least one second communication device may be located within radio range of the first communication device, i.e. the at least one second communication device may be located in the vicinity of the first communication device. For example, the at least one second communication device may be located close enough with respect to the first communication device for reliably transmitting the PRS to the first communication device. A path loss of the PRSs may be below a predetermined value. The PRS may be transmitted from the second communication device to the first communication device as a signal dedicated for the first communication device. In other examples, the PRS may be broadcasted by the second communication device. Hence, multiple first communication devices which are located close enough to the first communication device may receive the PRS.

Triggering the at least one second communication device to transmit the PRS to the first communication device can include sending a respective control message to the second communication device. A respective query could be sent to the LS. The LS could command the BS to transmit a respective request.

Triggering the at least one second communication device to transmit the PRS to the first communication device for increasing the positioning accuracy of the positioning of the first communication device may be based on an (intermediate) result of a positioning process for positioning of the first communication device. In detail, the positioning process for positioning of the first communication device may not fulfil predetermined positioning requirements of the first communication device, for example a required positioning accuracy for the first communication device may not be obtained by the positioning process without assistance of the second communication device. Therefore, the at least one second communication device is triggered to transmit a PRS associated with the positioning process Thus, the positioning process may include transmissions of a plurality of PRSs from a plurality of devices including for example BSs of the wireless communication network and the second communication device. The positioning processes may be considered as including two distinct sub-processes: a first sub-process without the second communication device transmitting the PRS, and a second sub-process with the second communication device transmitting the PRS.

According to further examples, a method for operating a network node in a wireless communication network comprises receiving, from at least one second communication device, an indication of a capability of the at least one second communication device to achieve a time synchronisation with at least one further device of the wireless communication network participating in a positioning process for positioning of a first communication device operated in the wireless communication network. The at least one second communication device is selectively triggered to transmit a PRS associated with the positioning process depending on the capability of the at least one second communication device to achieve the time synchronisation with the at least one further device of the wireless communication network.

For determining a position of a communication device based on time difference of arrival (TDoA) measurements of PRSs, the involved devices may need to be accurately synchronised. As a general rule, this includes time-domain and/or frequency-domain synchronisation. The at least one further device participating in the positioning process may comprise any device which is suitable for achieving time synchronisation for the at least one second communication device to support and enhance positioning of the first communication device. For example, the at least one further device may comprise a BS of the wireless communication network. In other examples, the at least one further device may comprise another communication device operated in the wireless communication network, for example a user equipment or a terminal device being accurately synchronised with other devices of the wireless communication network providing PRSs for the positioning process of the first communication device. For example, the at least one further device may comprise a communication device acting as another second communication device. Thus, several second communication devices may synchronise with each other, wherein at least one of the several second communication devices may be synchronised to an infrastructure device of the wireless communication network, for example a stations; this could be labelled a daisy-chain synchronisation scenario. In further examples, the at least one further device may comprise a timing source of a global navigation satellite system which may also be used by the wireless communication network for synchronisation, for example for synchronising a timing of one or more BSs of the wireless communication network. In further examples, the at least one further communication device may comprise the first communication device, which may be synchronised to the wireless communication network via for example a global navigation satellite system. The at least one second communication device may achieve time synchronisation with the at least one further device for example via a round-trip time (RTT) measurement.

According to various examples, a method for operating a network node in a wireless communication network is provided. A positioning of a first communication device operated in the wireless communication network is performed by a positioning process. The positioning process may provide a positioning accuracy of the positioning of the first communication device. According to the method, an indication is received from at least one second communication device. The indication is indicative of a further positioning accuracy of a further positioning which relates to the at least one second communication device. The further positioning and the further positioning accuracy are provided by at least one further positioning process. The at least one second communication device is selectively triggered to transmit a PRS associated with the positioning process for positioning the first communication device depending on said further positioning accuracy. For example, the at least one second communication device may be triggered only, if the further positioning accuracy fulfils a predefined accuracy condition.

As a general rule, the positioning accuracy may indicate an uncertainty or spread of the determined position of the respective positioning process.

In further examples, the method comprises determining a channel quality of a radio channel between the first communication device and the at least one second communication device. The at least one second communication device is selectively triggered to transmit the PRS depending on said channel quality. For example, one or more second communication devices may be selected for supporting the positioning of the first communication device by transmitting PRSs if the radio channel between the first communication device and the corresponding second communication devices provides sufficient quality in terms of signal-to-noise ratio, signal power level, bit error rate or comparable characteristics. For example, a Reference Signal Received Power (RSRP) may be considered for determining the channel quality. The channel quality may be determined based on a communication between the first and second communication devices. The channel quality may be determined by at least one of the first and second communication devices and may be communicated to the network node.

DL PRSs provided by the wireless communication network may comprise beamformed PRSs. A beamformed PRS may be configured such that it is transmitted essentially in specific directions only, for example covering a specific area or sector of a cell of a BS only. A phased-array using a distinct set of amplitude and phase relationships between respective antenna elements may be used for transmitting the beamformed PRS. Each beamformed PRS may comprise or may be associated with an identifier for identifying the corresponding beamformed PRS. The identifier may be a resource identifier of the resource for transmitting the PRS or a PRS index. According to the various examples, a first identifier of a first beamformed PRS received at the first communication device is determined. Additionally, a second identifier of a second beamformed PRS received at the second communication device is determined. The at least one second communication device is selectively triggered to transmit the PRS depending on the first and second identifiers. For example, the at least one second communication device may be selectively triggered to transmit the PRS if the first identifier is the same as the second identifier, or if the first identifier indicates a beam spatially adjacent to a beam indicated by the second identifier. Additionally or alternatively, the RSRP of the received first and second beamformed PRSs may be considered. The RSRP may be considered to correlate roughly with a distance between the BS and the receiving device. This corresponds to a linear path loss. For example, the at least one second communication device may be selectively triggered to transmit the PRS if the RSRP of the received first beamformed PRS and the RSRP of the received second beamformed PRS are within a predefined range. In other words, based on the first and second identifiers and the RSRP of the received first and second beamformed PRSs, it may be estimated whether the first and second communication devices are in vicinity, for example, if they are located in the same beam or in neighbouring beams and the distances between the BS and the first and second communication devices do not differ more than the predefined range.

In some examples, the method comprises triggering a round trip time (RTT) calibration using signals communicated between the at least one second communication device and at least one further device of the wireless communication network for achieving time synchronisation with the at least one further device of the wireless communication network for said transmitting of the PRS. The at least one further device may comprise for example a BS of the wireless communication network or another communication device operated in the wireless communication network, for example a mobile or stationary communication device. Thus, the time synchronisation of at least some or all devices involved in the positioning process for the first communication device may be achieved. This may not include the first communication device itself.

For example, a relative position of the at least one second communication device with respect to at least one further device of the wireless communication network which transmits a further PRS may be determined. The at least one further device may comprise for example a BS of the wireless communication network or another communication device operated in the wireless communication network, for example a mobile or stationary communication device. Based on the relative position and the further PRS, a time synchronisation with the at least one further device may be achieved. The time synchronisation may be used for synchronising the transmission of the PRS.

For example, in more detail, a time-of-flight of the further PRS may be observed, and the time synchronisation may be achieved based on the relative position and the time-of-flight of the further PRS.

For example, the second communication device may have information about positions of BSs participating in a positioning process. For example, the information may specify respective geolocations or relative distances. Furthermore, it is assumed that the second communication device accurately knows its position. Thus, a distance between a BS and the second communication device can be determined. The further PRS is transmitted from the BS to the second communication device. In the context of this example, the PRS transmitted from the BS to the second communication device is called "further PRS" to avoid confusion with the PRS which may be transmitted by the second communication device for increasing the positioning accuracy of the positioning of the first communication device. Based on the observed time-of-flight of the further PRS, the second communication device can calibrate its clock so that the time-of-flight matches its relative position to the BS. For example, if the second communication device determines that it is positioned at a distance of 300 meters from the BS, the time-of-flight of the further PRS from the BS to the second communication device should be precisely 1 μs. If the observed time-of-flight of the further PRS is 2 μs, it can be determined that the second communication device has a 1 μs clock offset.

According to various examples, the at least one predefined criterion comprises a positioning accuracy of the positioning provided by the positioning process of the first communication device. The positioning accuracy may be defined for example in terms of an estimated maximum deviation between the determined position and the real position of the first communication device. The positioning accuracy may be defined for example in terms of a number of devices participating in the positioning process. For example, the method may comprise performing a comparison between the positioning accuracy of the positioning provided by the positioning process and a threshold. The threshold may be fixed—e.g., semi-statically fixed or hard-coded—or the threshold may be dynamically assigned by an application requiring the positioning of the first communication device, e.g., before commencing the positioning process. The at least one second communication device is selectively triggered to transmit the PRS depending on the comparison.

As an example, an indoor navigation application may require a positioning accuracy of at least 2 m. Thus, the threshold may be set to 2 m, e.g., upon loading and executing the indoor navigation application. This corresponds to a dynamically assigned, yet predetermined threshold. If the positioning process determines that, in view of the currently received PRSs, the positioning accuracy does not achieve the required 2 m accuracy, at least one second communication device may be selectively triggered to transmit a further PRS such that a higher positioning accuracy may be achieved. In another example, an emergency application may require that the positioning process relies on PRSs from at least four different devices or origins. The threshold may then be set accordingly, upon loading and executing the emergency application. If the positioning process currently receives PRSs from only three different devices, for example from three different BSs, the at least one second communication device may be triggered to transmit further PRSs. As a result, the first communication device may then receive PRSs from four different devices, i.e. the three different BSs and the second communication device. The applications mentioned above requiring the positioning are example applications only and other applications may be subject to the techniques described herein.

In various further examples, the at least one predefined criterion comprises receiving a request for increasing the positioning accuracy from the first communication device. The first communication device can have various rules for requesting such an increase of the positioning accuracy. For example, from time to time, the first communication device may require more accurate positioning, e.g., for bookkeeping. The request may be received sporadically.

Additionally or as an alternative, the request for increasing the positioning accuracy may be received from a further device of the wireless communication network participating in the positioning process, for example the LS which determines the present position of the first communication device based on PRS measurements received from the first communication device. If the PRS measurements, for example TDoA measurements, do not provide sufficient accuracy, the LS may transmit the request for increasing the positioning accuracy to a BS for triggering the second communication device to transmit the PRS to the first communication device.

Additionally or as an alternative, the at least one predefined criterion may comprise receiving a request for increasing the positioning accuracy from a further device of the wireless communication network participating in the positioning process. The request may be triggered by an application running at least partially on the first communication device and requesting accurate positioning, for example a navigation application or an application indicating or acting in an emergency situation, for example an automatic emergency call system in a vehicle or a medical alarm system. Upon receiving the request, the at least one second communication device may be triggered to transmit the PRS to increase the positioning accuracy of the positioning of the first communication device.

According to further examples, alternatively or additionally, the at least one predefined criterion comprises a measurement quality of DL PRSs received from the wireless communication network at the first communication device. The measurement quality may be correlated to the communication quality of the radio channel in which the DL PRSs are received, i.e. the channel quality. The channel quality may be measured in terms of signal-to-noise ratio (SNR) when the positioning was performed, i.e. the SNR of the DL PRSs received for the positioning process. Furthermore, the measurement quality may be correlated to further values influencing the positioning process, for example a number of different devices from which the DL PRSs are received and/or the frequency with which the DL PRSs are received. For example, the measurement quality may be defined as a score value correlated to and combining one or more of the above described influencing values. For example, if a predefined or application-specific threshold for the measurement quality is not met, the at least one second communication device is triggered to transmit a PRS for increasing the positioning accuracy of the first communication device.

As will be appreciated from the above, various examples exist for implementing the predefined criterion. In particular, it is possible to use a multi-dimensional predefined criterion where aggregate conditions are checked.

According to further examples, the method may comprise that, upon the positioning process fulfilling the predefined criterion, a discovery process between the first communication device and the at least one second communication device is triggered. The discovery process between the first communication device and the at least one second communication device may be accomplished for example by a device-to-device communication. The discovery process may utilise identifying second communication devices located within radio range of the first communication device, i.e. second communication devices which are arranged in the vicinity of the first communication device.

The discovery process may be associated with a cause indicative of the intention to transmit the PRS for increasing the positioning accuracy of the first communication device. For instance, a discovery beacon transmitted as part of the discovery process could include a cause value that is set accordingly.

The discovery process, as a general rule, could be initiated by the first communication device or the second communication device. Typically, the initiating device transmits a discovery beacon, but other scenarios are conceivable.

In response to a completed discovery provided by the discovery process, a channel quality of a radio channel between the first communication device and the at least one second communication device may be determined. Thus, channel sounding may be implemented immediately after completing the discovery. This channel sounding could be conditionally triggered by the respective cause, as indicated above. In another example, separate commands may be transmitted, to trigger the channel sounding. For example, for each second communication device of the at least one second communication device, a corresponding channel quality of the radio channel between the first communication device and the corresponding second communication device may be determined. Based on the determined channel qualities, one or more of the second communication devices may be selected, for example those second communication devices for which the best channel quality is determined or for which the determined channel quality fulfils a predefined criterion. The selected second communication devices may be triggered to transmit corresponding PRSs for increasing the positioning accuracy of the positioning of the first communication device.

According to various examples, in response to a completed discovery provided by the discovery process, an allocation of radio resources to the at least one second communication device may be triggered. The radio resources are dedicated to the PRS. The PRS transmission in the allocated radio resources may comprise a dedicated transmission from the at least one second communication device to the first communication device or a broadcast transmission from the at least one second communication device. The allocation of the radio resources may be semi-persistent. A semi-persistent allocation of radio resources may comprise for example an allocation of resources which may be used by the second communication device for transmission of the PRS for a predetermined amount of time, until a trigger de-allocating the radio resources is received, or as long as a predefined condition is fulfilled, or a combination thereof. Resources can be allocated in a repetitive manner for the predetermined amount of time. For example, the predetermined amount of time may be in a range of a few tens or hundreds of milliseconds, or even a few seconds, for example 10 seconds. Within these few tens or hundreds of milliseconds, the second communication device may use the allocated radio resources for transmitting PRSs. The use of the allocated radio resources may be aborted upon receiving a corresponding message or signalling from the wireless communication network. Furthermore, the second communication device may abort using the allocated radio resources for example upon determining that the first communication device has moved out of radio reach of the second communication device.

According to various examples, the method further comprises transmitting, to the first communication device and the at least one second communication device, an indication of a radio resource allocated by the wireless communication network and dedicated to the PRS. This may correspond to a resource assignment scheduling control message. The indication of the radio resource may trigger the first communication device to receive the PRS transmitted in the radio resource.

According to various examples, a method for operating a first communication device in a wireless communication network comprises monitoring for DL PRSs from the wireless communication network. The DL PRSs are associated with a positioning process for positioning of the first communication device. While participating in the positioning process, the first communication device monitors for a trigger from the wireless communication network to monitor for a PRS associated with the positioning process and transmitted by a second communication device. Upon detecting the trigger, the first communication device monitors for the PRS transmitted by the second communication device for positioning measurement or positioning estimation.

In other words, the first communication device may initially participate in the positioning process by monitoring for DL PRSs from the wireless communication network, for example from BSs of the wireless communication network—but not from the second communication device. Upon detecting the trigger, the first communication device then participates in the positioning process by monitoring for the DL PRSs from the wireless communication network and additionally for the PRS from the second communication device. Thus, it can again be said that the positioning process is structured into two sub-processes. As a result, the positioning accuracy of the positioning process for positioning of the first communication device may be improved upon support from the PRS from the second communication device.

Accuracy requirements concerning the positioning of the first communication device may be based on applications (as already explained above) and/or general requirements defined in standards relating to the wireless communication network, for example as defined in 3GPP TS 22.261. According to this, different levels of services and requirements, for instance on performance (e.g. accuracy, positioning service availability, positioning service latency) may be defined. The different service levels may specify requirements concerning absolute or relative positioning, horizontal accuracy and vertical accuracy, positioning service availability, positioning service latency, coverage, environment (indoor or outdoor) and velocity of the first communication device.

Therefore, in various examples, the first communication device may transmit a request for increasing the positioning accuracy—e.g., after performing a coarse positioning or even prior to commencing the positioning process, i.e., when generally in a need of obtaining high positioning accuracy—for example upon request from an application running on the first communication device. The trigger from the wireless communication network may therefore be associated with the request for increasing the positioning accuracy.

The trigger may comprise an indication of a radio resource dedicated to the PRS transmitted by the second communication device. A resource assignment scheduling message may be received.

According to further examples, a method for a second communication device operated in a wireless communication network is provided. The method comprises participating in a discovery process with a first communication device. In response to a completed discovery provided by the discovery process, an indication of a radio resource dedicated to a PRS associated with a positioning process for positioning of the first communication device is received. A PRS is transmitted in the radio resource.

According to various examples, a method for a second communication device operated in a wireless communication network is provided. The method comprises transmitting, to the wireless communication network, an indication of a capability of the second communication device to participate in a positioning process for positioning of a first communication device. Furthermore, according to the method, the second communication device participates in a discovery process with the first communication device. In response to a completed discovery provided by the discovery process, a trigger to transmit a positioning reference signal associated with the positioning process is received. The positioning reference signal is transmitted. The indication may include information which allows for example a location server to infer that the second communication device may be used to assist the positioning process for the first communication device. For example, the indication may include information of a capability of the second communication device for signalling of PRSs, for example, a capability of the communication device to achieve in general a time synchronisation which is sufficiently accurate for providing PRSs, for example a capability of the communication device to time synchronise to another device or node of the wireless collocation network with a required accuracy. Furthermore, the indication may include information whether the second communication device provides sufficient computing power and electrical power for participating in the positioning process for the first communication device.

Based on the discovery process, the wireless communication network may determine that the second communication device is within radio range of the first communication device and may therefore select the second communication device for supporting the positioning process of the first communication device by transmitting a PRS. Radio resources to be used for transmitting the PRS may be provided by the wireless communication network and may trigger the transmission of the PRS in the second communication device.

According to various examples, a method for a second communication device operated in a wireless communication network comprises transmitting an indication of a capability of the second communication device to achieve time synchronisation with at least one further device of the wireless communication network participating in a positioning process for a positioning of a first communication device. The at least one further device may comprise for example a BS of the wireless communication network or another communication device which is also involved in the positioning process for the first communication device, for example another communication device which transmits PRSs dedicated for the positioning process of the first communication device. In response to transmitting the indication of the capability of the second communication device to achieve the time synchronisation, an indication of a radio resource dedicated to a PRS associated with the positioning of the first communication device is received. The PRS is transmitted in the radio resource.

Time synchronisation may be a helpful aspect when transmitting PRSs. Thus, upon indicating by the second communication device that the second communication device is capable of achieving time synchronisation with the wireless communication network, the second communication device may be selected by the wireless communication network to transmit a PRS which may contribute to improve the positioning of the first communication device. Triggering the second communication device to transmit the PRS may be achieved by indicating the radio resource dedicated to the PRS.

According to various examples, a method for a second communication device operated in a wireless communication network is provided. In the wireless communication network, a positioning process for positioning a first communication device is performed. The method comprises transmitting an indication of a positioning accuracy of a further positioning of the second communication device provided by at least one further positioning process. In other words, the further positioning process performs a positioning (named further positioning) for the second communication device, i.e. based on the further positioning process a position of the second communication device may be determined. In response to transmitting the indication of the positioning accuracy of the positioning of the second communication device, an indication of a radio resource dedicated to a PRS associated with the positioning of the first communication device is received. A PRS is transmitted in the radio resource.

Positioning of the devices which transmit the PRSs may be a further helpful aspect for achieving high positioning accuracy. Thus, upon indicating by the second communication device the achieved positioning accuracy of the positioning of the second communication device, the second communication device may be selected by the wireless communication network to transmit PRSs which may contribute to improve the positioning of the first communication device. Triggering the second communication device to transmit the PRS may be achieved by indicating the radio resource dedicated to the PRS.

In various examples, the method comprises participating in a round trip time calibration using signals communicated between the second communication device and at least one further device of the wireless communication network for achieving a time synchronisation with the at least one further device of the wireless communication network for the transmission of the PRS. The at least one further device may comprise for example a BS of the wireless communication network or another communication device being time synchronised to the wireless communication network.

For example, for a round trip time calibration, a LS of the wireless communication network may initiate transmission of a PRS to the second communication device, for example from a BS. The PRS is received at the second communication device and sent back by the second communication device with an accurate delay. This enables the LS to estimate both, the distance and clock discrepancy. A timing offset can either be signalled to the second user equipment or the round trip time procedure can be reversed.

According to further examples, the method comprises determining a relative position of the second communication device with respect to at least one further device of the wireless communication network transmitting a further PRS. The at least one further device may comprise for example a BS of the wireless communication network or another communication device being time synchronised to the wireless communication network. Based on the relative position and the further PRS, a time synchronisation with the at least one further device of the wireless communication network is achieved for the transmission of the PRS.

For example, the method may comprise observing a time-of-flight of the further PRS. The time synchronisation may be achieved based on the relative position and the time-of-flight of the further PRS.

In further examples, the method may comprise achieving time synchronisation with a timing of the wireless communication network for the transmission of the PRS based on signals received from a global navigation satellite system.

According to further examples, a network node for a wireless communication network is provided. The network node comprises control circuitry configured to determine, whether a positioning process for positioning of a first communication device operated in the wireless communication network fulfils at least one predefined criterion. Upon determining that the positioning process fulfils the at least one predefined criterion, the control circuitry is furthermore configured to trigger at least one second communication device operated in the wireless communication network and located within radio range of the first communication device to transmit a PRS associated with the positioning process. As a result, a positioning accuracy of the positioning of the first communication device provided by the positioning process may be increased.

The network node may be configured to perform the above-described method and the embodiments thereof.

According to various examples, a first communication device for a wireless communication network is provided. The first communication device comprises control circuitry configured to monitor for DL PRSs from the wireless communication network. The DL PRSs are associated with a positioning process for positioning of the first communication device. While participating in the positioning process, the control circuitry is configured to monitor for a trigger from the wireless communication network to monitor for a PRS associated with the positioning process and transmitted by a second communication device. Upon detecting the trigger, the control circuitry is configured to monitor for the PRS.

The first communication device may be configured to perform the above-described method and the embodiments thereof.

In further examples, a second communication device for a wireless communication network is provided. The second communication device comprises control circuitry configured to participate in a discovery process with a first communication device. In response to a completed discovery provided by the discovery process, the control circuitry is configured to receive an indication of a radio resource dedicated to a PRS associated with a positioning process for positioning of the first communication device, and to transmit the PRS in the radio resource.

According to further examples, a second communication device for a wireless communication network is provided. The second communication device comprises control circuitry configured to transmit, to the wireless communication network, an indication of a capability of the second communication device to participate in a positioning process for positioning of a first communication device, and to participate in a discovery process with the first communication device. In response to a completed discovery provided by the discovery process, the control circuitry is configured to receive a trigger to transmit a positioning reference signal associated with the positioning process, and to transmit the positioning reference signal.

The second communication device may be configured to perform the above-described method and the embodiments thereof.

According to the various examples, a wireless communication network is provided. The wireless communication network comprises the above-described network node, the above-described first communication device and at least one second communication device as described above.

According to various examples, computer programs or a computer program products or a computer-readable storage media are provided which include program code executable by least one processor. When executing the program code, the at least one processor can perform methods as described above.

Although specific features in the above summary and the following detailed description are described in connection with specific embodiments and aspects of the present invention, it should be understood that the features of the exemplary embodiments and aspects may be combined with each other unless specifically noted otherwise.

BRIEF DESCRIPTION OF THE DRAWINGS

Embodiments of the invention will be described in more detail with reference to the accompanying drawings.

FIG. 5 shows a flowchart of a message flow between network nodes and communication devices according to further examples.

DETAILED DESCRIPTION OF THE EMBODIMENTS

In the following, exemplary embodiments of the present invention will be described in more detail. It is to be understood that the features of the various exemplary embodiments described herein may be combined with each other unless specifically noted otherwise. Any coupling between components or devices shown in the figures may be a direct or indirect coupling unless specifically noted otherwise. Same reference signs in the various drawings refer to similar or identical components, functions, actions or method steps.

Hereinafter, techniques for implementing a positioning process for positioning of a first communication device are described. The techniques can have implications at the first communication device, at one or more network nodes, and one or more further second communication devices. This means that all such devices can participate in the positioning process.

The techniques described herein facilitate a high positioning accuracy for said positioning of the first communication device. This is based on the finding that, sometimes, it can be helpful if the one or more further second communication devices contribute to the positioning process by transmitting PRS associated with the positioning process towards the first communication device.

The techniques described herein facilitate an efficient configuration of the one or more second communication devices to transmit the PRS. In particular, conditional transmitting of the PRS by the one or more second communication devices can be implemented, e.g., tailored to scenarios in which there is a concrete need for an increased positioning accuracy. This reduces the control-signalling overhead on the spectrum. In this respect, it can be checked—e.g., repeatedly—whether the positioning process fulfils one or more predefined criteria; based on such check, the transmission of the PRS by the one or more second communication devices can be selectively triggered or not triggered.

Further, the techniques described herein facilitate an efficient selection of the one or more second communication devices from multiple candidate communication devices. For example, such candidate communication devices can be triggered to transmit the PRS which have an accurate synchronisation to a timing associated with the positioning process. Further, such candidate communication devices can be triggered to transmit the PRS which have an accurately known position themselves. Alternatively or additionally, a path loss or channel quality between the candidate communication devices and the first communication device can be considered when selecting the candidate communication devices.

Figure 1:
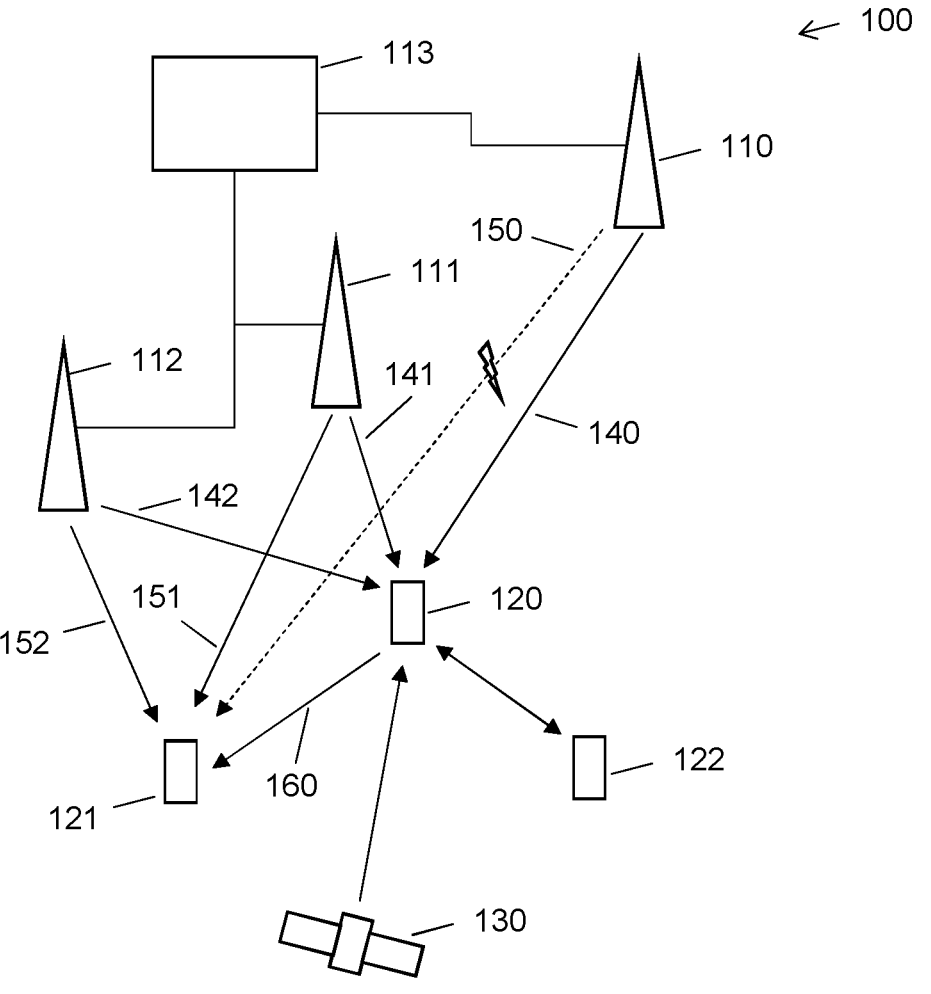
FIG. 1 shows schematically a wireless communication network comprising network nodes and communication devices according to various examples.

FIG. 1 schematically shows a wireless communication network 100. The wireless communication network 100 comprises a plurality of network nodes 110 to 113. In the wireless communication network 100 a plurality of communication devices 120 to 122 may be arranged.

The wireless communication network 100 may comprise for example a cellular Long Term Evolution (LTE) system or 5G New Radio (NR) system as defined by 3GPP. The wireless communication network 100 provides a wireless communication between the communication devices 120 to

122 and network nodes 110 to 113 of the wireless communication network 100. A network node may comprise for example a base station (BS) or access device of the wireless communication network 100, for example an eNB in LTE systems or a gNB in 5G NR systems. In FIG. 1, the network nodes 110 to 112 comprise BSs. A network node may comprise for example a Location Server (LS). In FIG. 1, the network node 113 comprises a LS. A network node may be considered to comprise both, a BS and a LS.

The wireless communication network 100 can further include a core network not illustrated in FIG. 1. The core network can include a user plane and a control plane. Sometimes, the LS is arranged in the core network.

Figure 2:
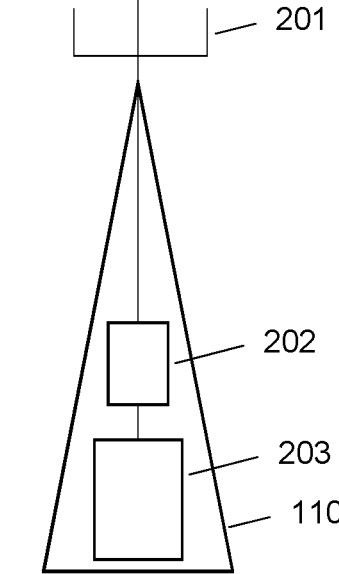
FIG. 2 shows schematically a network node according to various examples.

FIG. 2 shows details of an exemplary network node, for example the BS 110 of FIG. 1. The network node 110 comprises an antenna 201, a transceiver 202 and control circuitry 203. Under control of the control circuitry 203, the transceiver 202 may receive and transmit radio signals via antenna 201. The radio signals may comprise PRSs and further signals as will be described below in more detail. Furthermore, the control circuitry 203 may be configured to perform techniques and methods described below in more detail.

A communication device of the communication devices 120 to 122 may comprise for example a terminal device or User Equipment (UE) like a mobile telephone, in particular a so-called smart phone, a tablet PC or an Internet of Things (IoT) device. However, the communication devices 120 to 122 are not restricted to terminal devices, but may also be comprised by a BS (e.g., a mobile base station), relay device or access device of the wireless communication network.

Figure 3:
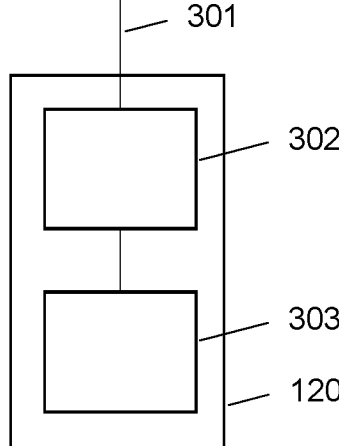
FIG. 3 shows schematically a communication device according to various examples.

FIG. 3 shows details of an exemplary communication device, for example the communication device 120 of FIG. 1. The communication device 120 comprises an antenna 301, a transceiver 302 and control circuitry 303. Under control of the control circuitry 303, the transceiver 302 may receive and transmit radio signals via antenna 301. The radio signals may comprise PRSs and further signals as will be described below in more detail. Furthermore, the control circuitry 303 may be configured to perform techniques and methods described below in more detail.

Positioning of a communication device 120 to 122 may be relevant for a number of different applications and services, for example indoor and outdoor navigation and in emergency situations, for example emergency calls. For positioning of a communication device, i.e. for determining a position of a communication device 120 to 122, a positioning process utilising PRSs from the wireless communication network 100 may be performed.

For example, 3GPP NR positioning techniques may rely on time of flight (TOF) based observed time difference of arrival (OTDOA) where multiple BSs transmit PRSs. Each PRS transmission may have an associated beam direction (elevation and azimuth), a sequence for TOF estimation, and a BS identifier. For example, a communication device camping on a cell and connected to a BS of the cell may be time synchronised to that BS, for example via Synchronisation Signal Block (SSB) signals. The synchronisation in time and frequency may be needed to maintain a communication between the communication device and the BS. However, the time synchronisation based on the SSB signals may not be as accurate as needed for positioning. For example, in LTE this type of synchronisation establishes DL OFDM grid synchronisation with a resolution of about 0.5 μs. The local time reference at the communication device will therefore be delayed approximately by the time of flight, related to the distance to the connected BS.

A received PRS (designed as a wide band signal for accurate relative timing measurement) from the BS will have the same delay as the SSB signal (as it is the same distance) and the communication device will therefore not be able to estimate its distance to the BS based only on this single signal. However, if the communication device receives a PRS from a second BS, assuming the BSs are well synchronised, this signal will have a different delay profile (if the distance to the communication device is different). The relative time profiles associated with each PRS enable the communication device to more accurately compute its position. Further, the associated beam direction information may enable the communication device to narrow the possible position to a segment. With a third BS at a third position, synchronised with the first and second BSs, the communication device can compute its position based on the relative time of arrival (TOA) estimates for each PRS from the BSs, which is called reference signal time difference (RSTD) based measurement.

In general, for a RSTD based measurement to obtain and calculate a positioning, based on a DL time difference of arrival (DL-TDOA) principle, a reference point (origin) of a DL PRS (DL-PRS) transmission needs to be known. Further, a time stamp (i.e. when the DL-PRS was transmitted) or time information enabling the receiving communication device to estimate the travel time from the point of origin to the communication device may be needed. A plurality of DL-PRS from different origins may be combined to estimate the position of the communication device, for example by use of multi-lateration (e.g. trilateration).

FIG. 1 illustrates the above positioning techniques for positioning exemplary communication device 120. As indicated by arrows 140 to 142, the communication device 120 may receive PRSs from BSs 110 to 112. For example, as the communication device 120 receives PRSs from three BSs, a position of the communication device 120 may be obtained based on the time difference of arrival of the PRSs and the corresponding points of origin. The position of the communication device 120 may be determined in the communication device 120, or the communication device 120 may transmit the measured time difference of arrival to the LS 113 which determines the position of the communication device 120 based on the time difference of arrival and the points of origin, i.e. the locations of the antennas of the BSs 110 to 112.

For example, positioning of a communication device may be obtained as long as PRSs from at least three BSs may be received. However, as illustrated in FIG. 1, communication device 121 may receive PRSs from BSs 111 and 112 as indicated by arrows 151 and 152, but communication device 121 may not receive the PRS from BS 110 as indicated by the dashed arrow 150 (this is illustrated in FIG. 1 by the flash and the dotted line). The PRS from BS 110 may be disturbed due to the large distance between communication device 121 and BS 110, or for other reasons such as obstructions or variation in the terrain, for example because of disturbing signals from other cells (not shown). In this case, communication device 120 may be instructed by the wireless communication network 100 to transmit a PRS 160 which may support the positioning of the communication device 121. However, this requires that the PRS 160 from the communication device 120 is transmitted at a precisely defined point in time such that a time of flight can reliably be determined. In other words, it may be required that communication device 120 achieves time synchronisation with the other devices transmitting PRSs. Furthermore, it may be required that the position of the communication device 120 is accurately known.

Several techniques may be utilised for achieving time synchronisation, which will be described in more detail below and which may include for example techniques for synchronising with one or more of the BSs 110 to 112, techniques for synchronising with another communication device 122 which is already synchronised, and techniques for synchronising with a global timing, provided for example by a satellite system 130 of a global navigation satellite system (GNSS).

Figure 4:
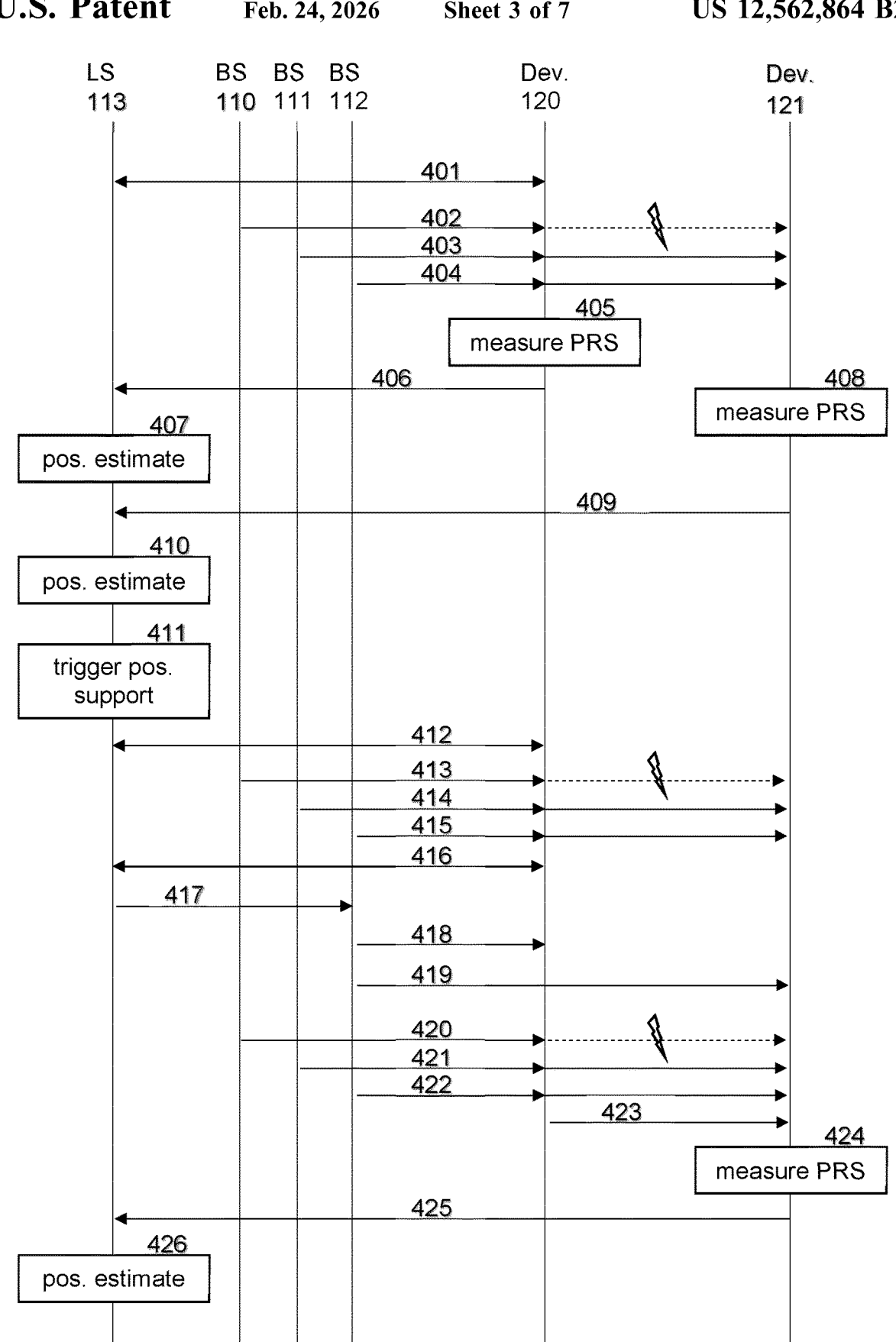
FIG. 4 shows a flowchart of a message flow between network nodes and communication devices according to various examples.

In connection with FIGS. 4 and 5, exemplary techniques for supporting positioning of the communication device 121 in the scenario of FIG. 1 will be described. FIGS. 4 and 5 illustrate an overview of the communication between the involved devices and nodes. Based on the overview of FIGS. 4 and 5, FIGS. 6 to 8 illustrate further details of the processing within the involved devices and nodes.

Communication device 121, whose positioning is supported by PRSs from communication device 120, will be named in the following "supported communication device" and is named in the claims "first communication device". Communication device 120, which supports the positioning of communication device 121 by transmitting PRSs, will be named in the following "supporting communication device" and is named in the claims "second communication device".

FIG. 4 illustrates an exemplary communication between the LS 113, BSs 110 to 112, supporting communication device 120 and supported communication device 121.

At 401, the supporting communication device 120 communicates its general capability for signalling of PRSs to the LS 113, for example via one of the BSs 110 to 112. Additionally, the BSs 110 to 112 may be notified of the general capability for signalling of PRSs by the supporting communication device 120. Several or all communication devices arranged or communicating in the wireless communication network 100 may communicate their general capabilities for signalling of PRSs such that a network node of the wireless communication network, for example the LS 113, may select one or more of the communication devices as supporting communication devices if needed. The general capability for signalling of PRSs may include, for example, a capability of the communication device to achieve in general a time synchronisation which is sufficiently accurate for providing PRSs, for example a capability of the communication device to time synchronise to another device or node of the wireless collocation network with a required accuracy. The required accuracy may be for example a microsecond, 100 nanoseconds, or 10 nanoseconds. Furthermore, the general capability for signalling of the PRSs may include whether the communication device provides sufficient computing power and electrical power.

Each BS 110 to 112 may transmit corresponding PRSs 402 to 404 in regular terms, upon request from the LS 113 or according to a predefined scheduling. The PRSs 402 to 404 may be transmitted at exactly the same time or with predefined offset. The PRSs 402 to 404 may be broadcasted. As described above, the PRSs 402 to 404 may be transmitted as beamformed radio signals. Each of the PRSs 402 to 404 may comprise information indicating the point in time of transmission, the BS (origin) from which it was transmitted, and/or an identifier for the PRS itself, for example in case that a plurality of beamformed PRSs are transmitted by the same BS at the same time in different directions.

At 405, the communication device 120 receives the PRSs 402 to 404 and measures timing information of the reception of the PRSs 402 to 404, for example a time difference of arrival between the received PRSs 402 to 404. Based on the time difference of arrival and positioning information of the origins of the PRSs, i.e. the positions of the antennas of the BSs 110 to 112, the communication device 120 may determine its position. The position may be determined as an absolute position, for example in terms of longitude and latitude and altitude, or as a relative position with respect to a reference system defined by the wireless communication network. As an alternative, the measured timing information of the received PRSs 402 to 404 may be communicated at 406 to the LS 113, and the LS 113 may estimate the position of the communication device 120 based on the timing information and positioning information of the origins of the PRSs at 407.

Likewise, at 408, the communication device 121 receives the PRSs 403 and 404. However, as indicated in FIG. 4 by the dashed line and the flash, PRS 402 may not reach the communication device 121 or the PRS 402 may not be received at the communication device 121 with sufficient quality. Nevertheless, the communication device 121 may measure timing information of the reception of the PRSs 403 and 404 and may communicate the timing information at 409 to the LS 113. The LS 113 may try to estimate the location of the communication device 121 based on the received timing information at 410, but may determine that positioning of the communication device 121 is not possible or has limited positioning accuracy based on only two detected PRSs 403 and 404. Additionally or as an alternative, at 409, the communication device 121 may request for increasing the positioning accuracy. Consequently, at 411, the LS 113 may trigger a positioning support for the communication device 121.

The LS 113 may select one or more communication devices for supporting the positioning for the communication device 121. The selection may be based on the general capabilities of the communication devices arranged in the wireless collocation network 100 as received at 401. Furthermore, the selection may be based on whether a communication device is arranged in the vicinity of the communication device 121, for example within a radio range of the communication device 121. For example, the location of each of the communication devices may be at least roughly known from corresponding position estimates for the communication devices as described above in connection with step 407. Furthermore, in case the PRSs comprise beamformed radio signals, the LS may select a communication device for supporting positioning of the communication device 121 if the communication device receives a beamformed PRS which was also received by the communication device 121 or which is adjacent to a beamformed PRS received by the communication device 121. Further, the LS 113 may request positions from communication devices in the (neighbouring) area of the communication device 121 and a report on whether the communication devices can achieve accurate time synchronisation with the wireless communication network, for example with a BS of the wireless communication network. The communication devices which indicate that they are arranged in the vicinity of the communication device 121, which can provide sufficient positioning accuracy of their own position, and which can achieve accurate time synchronisation may be selected and requested to support positioning of the communication device 121 by transmitting additional PRSs.

A communication device may determine by itself whether it is capable of transmitting supporting PRSs, for example if it receives strong enough PRSs from three or more BSs, for example based on an accuracy threshold. Based on the received PRSs the communication device may accurately estimate the relative distance to the different BSs. The communication device may therefore also determine, for example based on known time of flight and distance, how to synchronise its clock and achieve high time synchronisation accuracy.

Assuming communication device 120 is selected, at 412, the LS 113 may request communication device 120 to support positioning of the communication device 121.

The BSs 110 to 112 may broadcast further PRSs 413 to 415. PRSs 413 to 415 may be received by supporting communication device 120. PRSs 414 and 415 may be received by communication device 121, but as indicated by the dashed line and the flash, PRS 413 may not reach the communication device 121 or may not be received at the communication device 121 with sufficient quality. PRSs 413 to 415 may be used by the supporting communication device 120 to increase time synchronisation accuracy. However, the supporting communication device 120 may determine that further improvement of time synchronisation is required, for example by comparing its current time synchronisation with a predefined threshold or with a threshold provided by the LS 113.

Likewise, positioning accuracy of the supporting communication device 120 may be improved by the PRSs 413 to 415. However, the supporting communication device 120 may determine that further improvement of the positioning accuracy is required, for example by comparing a current positioning accuracy with a predefined threshold or with threshold provided by the LS 113.

Time synchronisation may be improved for example by performing a round-trip time calibration in combination with, for example, one of the BSs 110 to 112 or with another communication device which provides an accurate time synchronisation, for example communication device 122 in FIG. 1. As a further alternative, the supporting communication device 120 may improve time synchronisation based on signals from satellites 130 of a global navigation satellite system.

Improving positioning of the supporting communication device 120 may be achieved by measuring the PRSs 413 to 415 and further PRSs being sent from further BSs or being sent repetitively from BSs 110 to 112. Furthermore, positioning of the supporting communication device 120 may be improved based on signals from the satellites 130 of the global navigation satellite system (GNSS).

At 416, the supporting communication device 120 may indicate that it is capable of supporting positioning for the communication device 121. The supporting communication device 120 may also indicate how the time synchronisation is achieved, for example whether it is achieved by radio access technology (RAT) dependent techniques (for example according to the above described round-trip time calibration) or whether it is achieved by RAT independent techniques (for example based on the GNSS).

For providing positioning support for the positioning of the communication device 121, additional radio resources may be required for transmitting or broadcasting the additional PRSs from the supporting communication device 120. For example, at 417, the LS 113 may request BS 112 to provide resources for the transmission of additional PRSs. As an alternative, the LS 113 may select radio resources for the transmission of additional PRSs and may communicate the selected radio resources to the BS 112. The BS 112 may communicate the allocated resources to the supporting communication device 120 at 418, and may communicate the allocated resources to the supported communication device 121 at 419. As an alternative, the resources for transmitting additional PRSs may be predefined and therefore, specific allocation of steps 417 to 419 may not be needed.

Based on the configurations above, a next cycle of the positioning process may comprise transmitting PRSs 420 to 422 from the BSs 110 to 112, and additionally transmitting PRS 423 from the supporting communication device 120. As indicated by the dashed line and the flash, PRS 420 may not reach the supported communication device 121 or may not be received at the supported communication device 121 with sufficient quality. However, the supported communication device 121 may now receive PRSs 421 and 422 from the BSs 111 and 112, and additionally the supported communication device 121 may now receive PRS 423 from the supporting communication device 120. As a result, the supported communication device 121 may measure PRSs from three origins at 424, and may communicate the measurements at 425 to the LS 113, which may estimate the position of the supported communication device 121 at 426. As the position estimate at 426 is based on three PRSs, an improved positioning accuracy may be achieved for the position of the supported communication device 121.

FIG. 5 illustrates a further exemplary communication between the LS 113, BSs 110 to 112, supporting communication device 120 and supported communication device 121.

Operations 401 to 410 correspond to those already described above in connection with FIG. 4 and will not be repeated.

As described above, at 411, the LS 113 may trigger a positioning support for the communication device 121. For selecting one or more communication devices for supporting the communication device 121, the LS 113 may trigger a discovery process. For example, the LS 113 may communicate to one or more of the BSs 110 to 112 a request for the discovery process. For example, based on the coarse positioning of the communication device 121 and the (known) positions of the BSs 110 to 112, the LS 113 may request BS 112 to prepare and initiate the discovery process at 501. BS 112 may allocate resources for the discovery process and may communicate the allocated resources for the discovery process and a trigger for performing the discovery process to the communication devices 120 and 121 at 502 and 503, respectively. The BS 112 may communicate the allocated resources and the trigger to further communication devices which are assumed to be arranged in the vicinity of the communication device 121.

Upon triggering the discovery process, the communication devices 120 and 121 and further communication devices arranged in the vicinity of the communication device 121 may discover each other at 504, for example by device-to-device communication using the allocated resources.

Based on the discovery process, a communication device may determine whether it is arranged in the vicinity of the communication device 121, for example if it is arranged within radio range of the communication device 121. Furthermore, a communication device may determine by itself whether it is capable of transmitting supporting PRSs, for example if it receives sufficiently strong PRSs from three or more BSs, for example based on an accuracy threshold. Based on the received PRSs the communication devices may accurately estimate the relative distance to the different BSs. The communication devices may therefore also determine, for example based on known time of flight and distance, how to synchronise their clocks and achieve high time synchronisation accuracy.

During the discovery process or after the discovery process, the BSs 110 to 112 may broadcast further PRSs 505 to 507. PRSs 505 to 507 may be received by supporting communication device 120. PRSs 506 and 507 may be received by communication device 121, but as indicated by the dashed line and the flash, PRS 505 does not reach the communication device 121 or cannot be received at the communication device 121 with sufficient quality. PRSs 505 to 507 may be used by the communication devices, for example by communication device 120, to improve positioning and/or time synchronisation of the communication devices.

At 508, the communication device 120 may indicate to the LS 113 that it is capable of providing PRSs for improving positioning accuracy of the communication device 121, for example because the communication device 120 has determined based on the discovery process that it is arranged in close vicinity to the communication device 121 and has achieved accurate positioning and time synchronisation.

The LS 113 may receive the indication from communication device 120 and from other communication devices announcing that they are capable of providing PRSs for improving positioning accuracy of the communication device 121. The LS 113 may select one or more of the announcing communication devices for supporting the positioning of the communication device 121 and may indicate the selected communication devices in a message to the BS 112 at 509.

Additionally, at 509, the LS 113 may request BS 112 to provide resources for the transmission of additional PRSs. As an alternative, the LS 113 may select radio resources for the transmission of additional PRSs and may communicate the selected radio resources to the BS 112. The BS 112 may communicate the allocated resources to the selected supporting communication devices including supporting communication device 120 at 510, and may communicate the allocated resources to the supported communication device 121 at 511. As an alternative, the resources for transmitting additional PRSs may be predefined and therefore, specific allocation of steps 509 to 511 may not be needed.

Operations 420 to 426 of FIG. 5 correspond to those already described above in connection with FIG. 4 and will not be repeated.

In the examples described above, PRSs from three BSs 110 to 112 were considered and one supporting PRS from the supporting communication device 120 was established for improving positioning of the communication device 121 in case the communication device 121 receives PRSs from two BSs only. However, this is an example only, and more than three BSs may be considered for positioning of the communication devices 120 and 121. For example, for achieving a required positioning accuracy, PRSs from five different origins may be required. In this case, even if the communication device 121 receives PRSs from three BSs, the LS may establish two supporting communication devices for achieving the required positioning accuracy.

Figure 6:
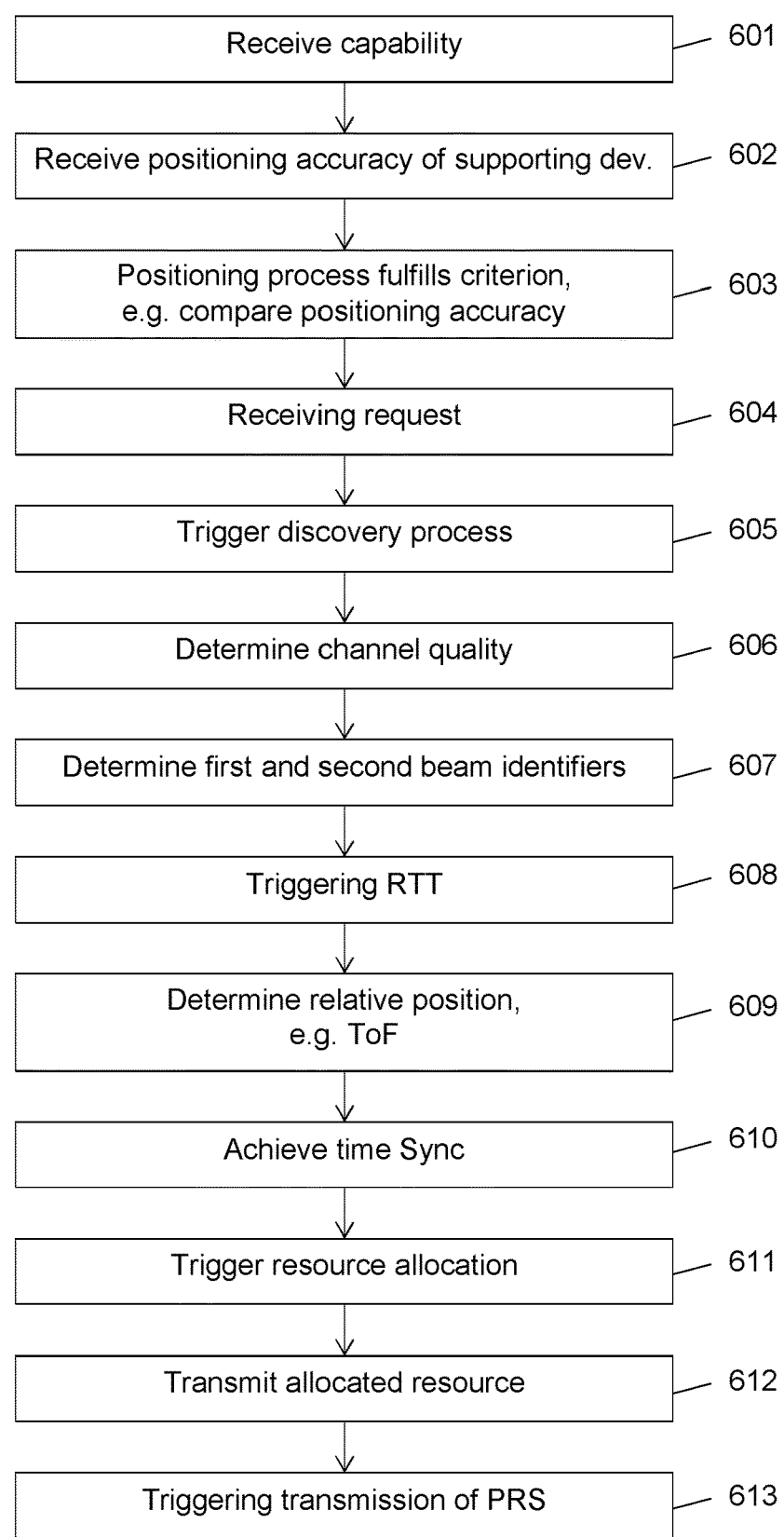
FIG. 6 shows a method for operating a network node according to various examples.

FIG. 6 shows method steps which may be performed by a network node, for example by one or more of the BSs 110 to 112 or the LS 113 of FIG. 1 or a combination thereof. As described above, in the wireless communication network 100, a positioning process for positioning communication devices may be performed. The positioning process may comprise a plurality of positioning process cycles which are subsequently performed, for example as described above in connection with FIG. 4, a first positioning process cycle based on PRSs 402 to 404, a second positioning process cycle based on PRSs 414 to 416, and a third positioning process cycle based on PRSs 420 to 422. These positioning process cycles may be considered as separate positioning processes or as sub-processes of a common positioning process.

In step 601, the network node may receive a capability of a communication device indicating whether the communication device is able to achieve time synchronisation with at least one further device of the wireless communication network for supporting positioning of another communication device, for example by providing PRSs. The at least one further device of the wireless communication network may comprise for example a BS of the wireless communication network or another communication device. Achieving accurate time synchronisation may be limited for example by hardware restrictions or processing restrictions, or by a current receive situation of the communication device. The network node may receive such capabilities of a plurality of communication devices which are currently operated in the wireless communication network. Based on the capability of each communication device, the network node may decide to select a respective communication device for supporting positioning of another communication device.

In step 602, the network node may receive an indication of a positioning accuracy of a communication device which, according to its capability, may be selected for supporting positioning of another communication device. While in the illustrated example the indication of the positioning accuracy is received, in other examples, alternatively or additionally, an indication of other figures of merit of the positioning associated with the communication device may be received, e.g., positioning measurement quality. The positioning accuracy of a communication device may vary depending on the position of the communication device, for example depending on the number of PRSs from different BSs (origins) which may be received at the current position of the communication device. Furthermore, the positioning accuracy may depend on general characteristics of radio channels between the communication device and the BSs (origins) from which the PRSs are received. Based on the positioning accuracy, the network node may decide whether to select the communication device for supporting positioning of another communication device.

In step 603, the network node may determine, based on a positioning process, whether the positioning process for positioning of a communication device operated in the wireless communication network fulfils at least one predefined criterion. For example, the predefined criterion may relate to positioning accuracy currently achieved by the communication device. The positioning accuracy may be compared to a threshold. Based on the comparison, the network node may decide whether positioning support for the communication device is needed or not. If positioning support for the communication device is needed, this communication device will become a "supported communication device", as discussed above. If positioning support is needed, the network node may trigger at least one other communication device operated in the wireless communication network and located within radio range of the supported communication device to transmit a PRS associated with the positioning process. The triggered at least one other communication device will become a "supporting communication device", as discussed above.

Additionally or as an alternative, in step 604, the network node may determine that the at least one predefined criterion is fulfilled when a request for increasing the positioning accuracy is received from the communication device, which is then considered to be the "supported communication device".

For determining which other communication device or other communication devices are to be selected and triggered to support the positioning of the supported communication device, several criteria may be applied.

For example, in step 605, a discovery process between the supported communication device and one or more candidate communication devices which are in principle capable of supporting the positioning of the supported communication device may be triggered. Based on the results of the discovery process, candidate communication devices within radio range of the supported communication device may be selected as supporting communication devices. In particular, in step 606, a channel quality of a radio channel between the supported communication device and the candidate communication devices may be determined and one or more of the candidate communication devices may be selected as supporting communication devices based on the channel quality.

Assuming that the PRSs are beamformed PRSs, and each beamformed PRS comprises a corresponding identifier and covers essentially only a specific spatial area or sector, method step 607 may be performed to select one or more supporting communication devices from a plurality of candidate communication devices. In particular, a first identifier of a first beamformed PRS received at the supported communication device may be determined, and a second identifier of a second beamformed PRS received at a candidate communication device may be determined. The candidate communication device may be selected as a supporting communication device based on the first and second identifiers. For example, if the first and second identifiers are identical, the candidate communication device is arranged in the same spatial area or sector as the supported communication device. Further, if the second identifier indicates that the second beamformed PRS is adjacent to the first beamformed PRS, the candidate communication device is arranged in spatial vicinity of the supported communication device or in a sector adjacent to the sector of the supported communication device.

Upon selecting one or more communication devices as supporting communication devices, the network node may inform the selected communication devices and may instruct the selected communication devices to achieve time synchronisation with at least one further device of the wireless communication network, for example with a BS or another communication device which is already synchronised to the wireless communication network.

For example, in step 608 the network node may trigger a round-trip time calibration using signals communicated between the selected supporting communication device and the at least one further device of the wireless communication network, i.e. a BS or another communication device which is already synchronised.

Additionally or as an alternative, in step 609 the network node may determine a relative position of the supporting communication device with respect to a further device of the wireless communication network, which is transmitting a PRS of a positioning process for positioning the supporting communication device. In general, the further device may comprise a BS, but the further device may also comprise another communication device which is acting as another supporting communication device and provides PRSs. The supporting communication device may achieve time synchronisation with the further device based on the relative position and the PRS from the further device in step 610. For example, the supporting communication device may observe the time of flight of the PRS from the further device and may achieve the time synchronisation based on the time of flight, the distance to the further device and the propagation speed of the PRS.

In step 611, allocation of radio resources for transmitting the PRS from the supporting communication device to the supported communication device may be triggered. For example, a BS of the wireless communication network may allocate the required radio resources. As an alternative, the LS or any other server of the wireless communication network may allocate the required radio resources.

In step 612, an indication of the allocated radio resources may be transmitted to the supported communication device and the one or more supporting communication devices.

In step 613, a transmission of PRSs using the allocated resources is triggered, for example by instructing the supporting communication device to transmit the PRS and by instructing the supported communication device to listen for PRSs on the allocated resources. As an alternative, the transmission of the indication of the allocated radio resources may be used as trigger for the supporting communication devices to transmit the PRS and for the supported communication device to listen for PRSs on the allocated resources.

Figure 7:
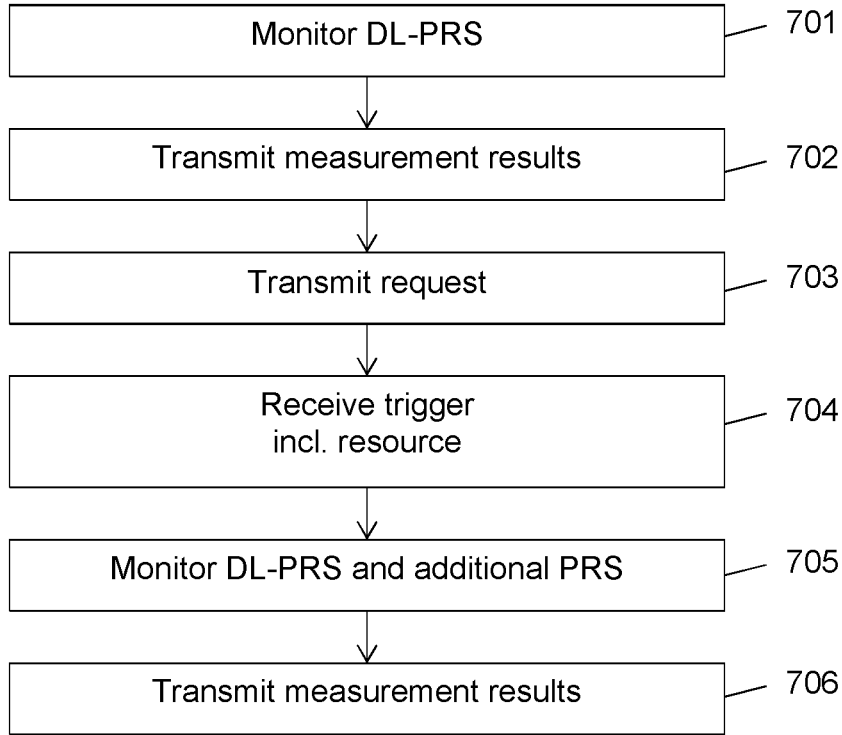
FIG. 7 shows a method for operating a first communication device according to various examples.

FIG. 7 shows method steps which may be performed by a communication device, in particular by the supported communication device 121 as described above in connection with FIGS. 4 and 5.

In step 701, the communication device may monitor for PRSs, in particular DL PRSs from network nodes, for example BSs, of the wireless communication network. The PRSs may be assigned to a positioning process for positioning of the communication device. Monitoring the PRSs may include for example determining the timing of the PRSs received from different origins, for example from different BSs. In particular, monitoring the PRSs may include determining a time difference of arrival of the PRSs from the different origins. The thus determined measurement results may include the time difference of arrival of the PRSs and the corresponding origins, for example identifiers of the originating BSs.

In step 702, the measurement results may be transmitted to a network node of the wireless communication network, for example to a LS. The LS may analyse the measurement results and may decide whether an improvement of the positioning of the communication device is required, for example by providing more PRSs, for example from supporting communication devices as described above in connection with FIGS. 4 and 5.

Additionally or as an alternative, in step 703, the communication device may transmit a request for increasing the positioning accuracy. The communication device may transmit the request upon determining that the measurement quality of the received PRSs does not fulfil predefined criteria of for example an application requiring positioning. Step 703 is optional: e.g., if the LS estimates the UE position, step 703 may not be required.

In step 704, the communication device may receive a trigger from the wireless communication network to monitor for a PRS associated with the positioning process and transmitted by a supporting communication device. The trigger may comprise an indication of a radio resource dedicated to the PRS transmitted by the supporting communication device.

Upon receiving the trigger in step 704, in step 705 the communication device may monitor for PRSs as described above in step 701 and additionally the communication device may monitor for PRSs transmitted from the supporting communication device in the indicated radio resources.

Based on the now received the PRSs, in step 706 the communication device may determine and transmit measurement results which may enable to increase positioning accuracy of the communication device.

Figure 8:
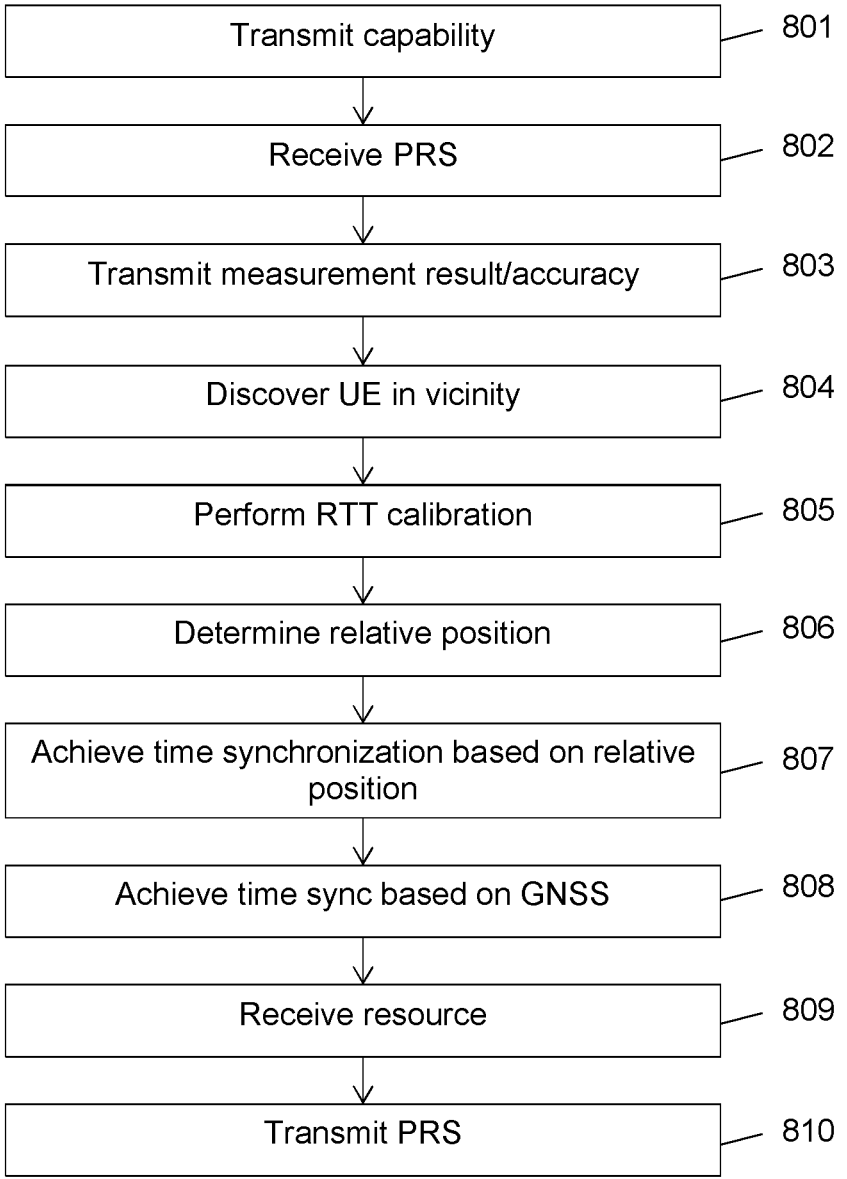
FIG. 8 shows a method for operating a second communication device according to various examples.

FIG. 8 shows method steps which may be performed by a communication device, in particular by the supporting communication device 120 as described above in connection with FIGS. 4 and 5.

In step 801, the communication device may transmit a capability of the communication device indicating whether the communication device is capable of achieving time synchronisation with at least one further device of the wireless communication network for supporting positioning of another communication device, for example by providing PRSs. The at least one further device of the wireless communication network may comprise for example a BS of the wireless communication network or another communication device. Achieving accurate time synchronisation may be limited for example by hardware restrictions or processing restrictions, or by a current receive situation of the communication device.

In step 802, the communication device may receive PRSs of a positioning process for positioning the communication device, i.e. for determining a position of the communication device.

In step 803, the communication device may transmit an indication of positioning accuracy or another figure of merit—e.g., positioning measurement quality—of the positioning of the communication device provided by the positioning process. For example, the communication device may transmit measurement results of the received PRSs to a LS of the wireless communication network for estimating the position of the communication device and an accuracy of the position estimate.

In response to indicating the capability of achieving time synchronisation and the positioning accuracy, the communication device may be selected by the LS or another network node of the wireless communication network as a candidate communication device for supporting positioning of another communication device, for example the supported communication device 120 as described above in connection with FIGS. 4 and 5. For this, the network node may need to determine whether the communication device is arranged in the vicinity of the supported communication device, i.e. whether the communication device is arranged within radio range of the supported communication device. As described above, the network node may determine vicinity based on identifiers of beamformed PRSs which may be provided with the measurement results above. Additionally or as an alternative, the network node may initiate a discovery process and the communication device may discover in step 804 the supported communication device. As a result, the communication device may be selected as a supporting communication device for supporting positioning of the supported communication device.

In step 805, the communication device may participate in a round-trip time calibration using signals communicated between the communication device and at least one further device of the wireless communication network for achieving a time synchronisation with the at least one further device. The round-trip time calibration may be initiated by the network node or the at least one further device. The at least one further device may comprise for example a BS of the wireless communication network or another communication device which is already time synchronised to a BS participating in the positioning process of the supported communication device.

In step 806, the communication device may determine a relative position of the communication device with respect to at least one further device of the wireless communication network which transmits a further PRS dedicated to a positioning of the communication device. The relative position may comprise for example a distance between the at least one further device and the communication device. For example, the relative position of the communication device with respect to the at least one further device may be determined based on a comparison of a known position of the at least one further device and the positioning process for the positioning of the communication device. The positioning process may rely on a time difference of arrival of PRSs, such that for positioning the communication device an accuracy of the time synchronisation is of minor significance. Then, for example by observing a time of flight of a PRS from the at least one further device, time synchronisation can be achieved based on the relative position and the time of flight in step 807.

Additionally or as an alternative, in step 808, time synchronisation with timing of the wireless communication network may be achieved based on signals received from a global navigation satellite system.

Now, a position of the supporting communication device may be determined accurately and a time synchronisation with the wireless communication network is achieved.

Next, in step 809, the communication device may receive an indication of a radio resource dedicated to a PRS associated with a positioning of the supported communication device. The communication device transmits the PRS in the radio resource in step 810. The PRS transmitted by the communication device, acting as the supporting communication device, may increase positioning accuracy of the positioning of the supported communication device.

The invention claimed is:

1. A method for operating a network node in a wireless communication network, the method comprising:
   determining whether a positioning process for positioning of a first communication device operated in the wireless communication network fulfils at least one predefined criterion, the at least one predefined criterion comprises a positioning accuracy of the positioning provided by the positioning process; and
   upon determining that the positioning process fulfils the at least one predefined criterion: triggering at least one second communication device operated in the wireless communication network and located within radio range of the first communication device to transmit a positioning reference signal associated with the positioning process.

2. The method of claim 1, further comprising:
   receiving, from the at least one second communication device, an indication of a capability of the at least one second communication device to achieve a time synchronisation with at least one further device of the wireless communication network participating in the positioning process, wherein the at least one second communication device is selectively triggered to transmit the positioning reference signal depending on the capability of the at least one second communication device to achieve the time synchronisation with the at least one further device of the wireless communication network.

3. The method of claim 1, further comprising:
receiving, from the at least one second communication
device, an indication of a further positioning accuracy
of a further positioning of the at least one second
communication device provided by at least one further
positioning process, wherein the at least one second
communication device is selectively triggered to trans-
mit the positioning reference signal depending on said
further positioning accuracy.

4. The method of claim 1, further comprising:
determining a channel quality of a radio channel between
the first communication device and the at least one
second communication device, wherein the at least one
second communication device is selectively triggered
to transmit the positioning reference signal depending
on said channel quality.

5. The method of claim 1, further comprising:
determining a first identifier of a first beamformed posi-
tioning reference signal received at the first communication device,
determining a second identifier of a second beamformed
positioning reference signal received at the second
communication device, wherein the at least one second
communication device is selectively triggered to transmit the positioning reference signal depending on the
first and second identifiers.

6. The method of claim 1, further comprising:
triggering a round trip time calibration using signals
communicated between the at least one second communication device and at least one further device of the
wireless communication network for achieving a time
synchronisation with the at least one further device of
the wireless communication network for said transmitting of the positioning reference signal.

7. The method of claim 1, further comprising:
determining a relative position of the at least one second
communication device with respect to at least one
further device of the wireless communication network
transmitting a further positioning reference signal, and
achieving a time synchronisation with the at least one
further device of the wireless communication network
for said transmitting of the positioning reference signal
based on the relative position and the further positioning reference signal.

8. The method of claim 7, further comprising:
observing a time-of-flight of the further positioning ref-
erence signal, and
achieving the time synchronisation based on the relative
position and the time-of-flight of the further positioning
reference signal.

9. The method of claim 1, further comprising:
performing a comparison between the positioning accu-
racy of the positioning provided by the positioning
process and a threshold, wherein the at least one second
communication device is selectively triggered to trans-
mit the positioning reference signal depending on the
comparison.

10. The method of claim 1, wherein the at least one
predefined criterion comprises receiving a request for
increasing the positioning accuracy from the first commu-
nication device and/or a further device of the wireless
communication network participating in the positioning
process.

11. The method of claim 1, wherein the at least one
predefined criterion comprises a measurement quality of downlink positioning reference signals received from the
wireless communication network at the first communication
device.

12. The method of claim 1, further comprising:
upon the positioning process fulfilling the predefined
criterion: triggering a discovery process between the
first communication device and the at least one second
communication device.

13. The method of claim 12, further comprising:
in response to a completed discovery provided by the
discovery process: determining a channel quality of a
radio channel between the first communication device
and the at least one second communication device.

14. The method of claim 12, further comprising:
in response to a completed discovery provided by the
discovery process: triggering an allocation of radio
resources to the at least one second communication
device, the radio resources being dedicated to the
positioning reference signal.

15. The method of claim 14, wherein the allocation of the
radio resources is semi-persistent.

16. The method of claim 1, further comprising:
transmitting, to the first communication device and the at
least one second communication device, an indication
of a radio resource allocated by the wireless commu-
nication network and dedicated to the positioning ref-
erence signal, the indication of the radio resource
triggering the first communication device to receive the
positioning reference signal transmitted in the radio
resource.

17. A method for operating a first communication device
in a wireless communication network, the method compris-
ing:
monitoring for downlink positioning reference signals
from the wireless communication network, the down-
link positioning reference signals being associated with
a positioning process for positioning of the first com-
munication device,
while participating in the positioning process: monitoring
for a trigger from the wireless communication network
to monitor for a positioning reference signal associated
with the positioning process and transmitted by a
second communication device, wherein the trigger is
based upon the positioning process fulfilling at least
one predefined criterion, the at least one predefined
criterion comprising a positioning accuracy of the
positioning process, and
upon detecting the trigger, monitoring for the positioning
reference signal.

18. The method of claim 17, wherein the at least one
predefined criterion further comprises receiving a request for
increasing the positioning accuracy from the first commu-
nication device and/or a further device of the wireless
communication network participating in the positioning
process.

19. A method for a second communication device oper-
ated in a wireless communication network, the method
comprising:
participating in a discovery process with a first commu-
nication device, wherein the discovery process is trig-
gered upon a positioning process of the first commu-
nication device fulfilling at least one predefined
criterion, the at least one predefined criterion comprises
a positioning accuracy of the positioning process for
positioning of the first communication device,
in response to a completed discovery provided by the
discovery process: receiving an indication of a radio resource dedicated to a positioning reference signal associated with the positioning process for positioning of the first communication device, and transmitting the positioning reference signal in the radio resource.

20. The method of claim 19, further comprising performing a comparison between the positioning accuracy of the positioning provided by the positioning process and a threshold, wherein the second communication device is selectively triggered to transmit the positioning reference signal depending on the comparison.

\* \* \* \* \*